United States Patent
Chapuis

(12) 
(10) Patent No.: US 6,850,046 B2
(45) Date of Patent: Feb. 1, 2005

(54) DIGITAL SIGNAL PROCESSOR ARCHITECTURE OPTIMIZED FOR CONTROLLING SWITCHED MODE POWER SUPPLY

(75) Inventor: Alain Chapuis, Morgan Hill, CA (US)

(73) Assignee: Power-One Limited (KM)

( * ) Notice: Subject to any disclaimer, the term of this patent is extended or adjusted under 35 U.S.C. 154(b) by 39 days.

(21) Appl. No.: 10/361,452

(22) Filed: Feb. 10, 2003

(65) Prior Publication Data

US 2004/0155637 A1 Aug. 12, 2004

(51) Int. Cl.[7] .................................................. G05F 1/40
(52) U.S. Cl. ...................................... 323/282; 363/65
(58) Field of Search ................................ 323/282, 283, 323/285, 284, 266, 222, 271, 272; 363/97, 40, 41, 21.7, 21.4, 20, 17, 131

(56) References Cited

U.S. PATENT DOCUMENTS 5,349,523 A * 9/1994 Inou et al. .................... 363/97

6,194,883 B1 * 2/2001 Shimamori .................. 323/283

* cited by examiner

*Primary Examiner*—Rajnikant B. Patel
(74) *Attorney, Agent, or Firm*—O'Melveny & Myers LLP

(57) ABSTRACT

A switched mode power supply comprises at least one power switch adapted to convey power between input and output terminals of the power supply, and a digital controller adapted to control operation of the at least one power switch responsive to an output parameter of the power supply. The digital controller comprises an analog-to-digital converter providing a digital error signal representing a difference between the output parameter and a reference value, a digital filter providing a digital control output based on a sum of current and previous error signals and previous control outputs, the error signals comprising integers having a relatively low numerical range and said control outputs comprising integers having a relatively high numerical range, and a digital pulse width modulator providing a control signal to the power switch having a pulse width corresponding to the digital control output. The digital filter further comprises an asymmetric arithmetic unit adapted to combine the low range integers with the high range integers.

26 Claims, 2 Drawing Sheets

DIGITAL SIGNAL PROCESSOR ARCHITECTURE OPTIMIZED FOR CONTROLLING SWITCHED MODE POWER SUPPLY

RELATED APPLICATION DATA

This application relates to copending application Ser. No. 10/361 667, for DIGITAL CONTROL SYSTEM AND METHOD FOR SWITCHED ODE POWER SUPPLY, filed concurrently herewith, the subject matter of which is incorporated by reference herein.

BACKGROUND OF THE INVENTION

1. Field of the Invention

The present invention relates to switched mode power supplies, and more particularly to digital control signal processor architecture optimized for controlling a switched mode power supply.

2. Description of Related Art

Switched mode power supplies are known in the art to convert an available direct current (DC) or alternating current (AC) level voltage to another DC level voltage. A buck converter in one particular type of switched mode power supply that provides a regulated DC output voltage to a load by selectively storing energy in an output inductor coupled to the load by switching the flow of current into the output inductor. It includes two power switches that are typically provided by MOSFET transistors. A filter capacitor coupled in parallel with the load reduces ripple of the output current. A pulse width modulation (PWM) control circuit is used to control the gating of the power switches in an alternating manner to control the flow of current in the output inductor. The PWM control circuit uses signals communicated via a feedback loop reflecting the output voltage and/or current level to adjust the duty cycle applied to the power switches in response to changing load conditions.

Conventional PWM control circuits are constructed using analog circuit components, such as operational amplifiers, comparators and passive components like resistors and capacitors for the feedback loop compensation, as well as a few digital circuit component blocks like logical gates and flip-flops. But, it is desirable to use entirely digital circuitry instead of the analog circuit components since digital circuitry takes up less physical space, draws less power, and allows the implementation of programmability features or adaptive control techniques. A conventional digital control circuit includes an analog-to-digital converter (ADC) that converts an error signal representing the difference between a signal to be controlled (e.g., output voltage ($V_o$)) and a reference into a digital signal having n bits. The digital error signal is provided to a digital controller having a transfer function G(z) and shapes the open loop gain to guarantee stability of the power supply feedback loop with enough phase margin. The digital output of the controller is provided to a digital phase width modulator (DPWM) that converts the output into a proportional pulse width signal that is used to control the power switches of the power supply.

In order to keep the complexity of the PWM control circuit low, it is desirable to hold the number of bits of the digital signal to a small number. At the same time, however, the number of bits of the digital signal needs to be sufficiently high to provide resolution good enough to secure precise control of the output value. Moreover, the ADC needs to be very fast to respond to changing load conditions. Current microprocessors exhibit supply current slew rates of up to 20 A/μs, and future microprocessors are expected to reach slew rates greater than 350 A/μs, thereby demanding extremely fast response by the power supply. The bit size of the digital signal also affects the complexity of the digital circuitry that implements the transfer function G(z). To further reduce circuit complexity, mathematical calculations are preferably done using integer representation of the numbers and an internal scaling factor can be defined to improve the calculation precision.

Nevertheless, there is a continuing need to further reduce the complexity of the digital circuit while providing high calculation precision. Thus, it would be advantageous to provide a system and method for digitally controlling a switched mode power supply that overcomes these and other drawbacks of the prior art. More specifically, it would be advantageous to provide a digital signal processor architecture optimized for controlling a switched mode power supply.

SUMMARY OF THE INVENTION

The present invention provides a switched mode power supply having a digital control system. The power supply comprises at least one power switch adapted to convey power between input and output terminals of the power supply, and a digital controller adapted to control operation of the at least one power switch responsive to an output measurement of the power supply.

More particularly, the digital controller comprises an analog-to-digital converter providing a digital error signal representing a difference between the output measurement and a reference value, a digital filter providing a digital control output based on a sum of present and previous error signals and previous control outputs, the error signals comprising integers having a relatively low numerical range and said control outputs comprising integers having a relatively high numerical range, and a digital pulse width modulator providing a control signal to the power switch having a pulse width corresponding to the digital control output. The digital filter further comprises an asymmetric arithmetic unit adapted to combine the low range integers with the high range integers. The digital filter further comprises an infinite impulse response filter providing the following transfer function G(z):

$$G(z) = \frac{PWM(z)}{VEd(z)} = \frac{C_0 + C_1 \cdot z^{-1} + C_2 \cdot z^{-2} + C_3 \cdot z^{-3}}{1 - B_1 \cdot z^{-1} - B_2 \cdot z^{-2} - B_3 \cdot z^{-3}}$$

wherein PWM(z) is the digital control output, VEd(z) is the error signal, $C_0 \ldots C_3$ are input side coefficients, and $B_1 \ldots B_3$ are output side coefficients. The infinite impulse response filter provides the following time discrete form transfer function:

$$PWM'_k = \frac{1}{K_1} \cdot (C'_0 \cdot VEd_k + C'_1 \cdot VEd_{k-1} + C'_2 \cdot VEd_{k-2} + C'_3 \cdot VEd_{k-3} + B'_1 \cdot PWM'_{k-1} + B'_2 \cdot PWM'_{k-2} + B'_3 \cdot PWM'_{k-3})$$

wherein $K_1$ and $K_2$ are scaling factors selected such that the scaled PWM'$_k$ signal will be in the range from 0 to $K_2-1$ and wherein PWM'$_k$ is the digital control output, VEd$_k$ is the error signal, and:

$$PWM'_k = K_2 \cdot PWM_k$$
$$C'_i = K_1 \cdot K_2 \cdot C_i$$
$$B'_i = K_1 \cdot B_i$$

In an embodiment of the invention, the arithmetic unit further comprises a multiplier adapted to multiply two operands, wherein a first operand comprises a first bit size and a second operand comprises a second, substantially larger, bit size. A first multiplexer is coupled to the multiplier to provide the first operand such that the first operand is selected from a group including the error signal, one of the previous error signals, and one of a plurality of first coefficients. A second multiplexer is coupled to the multiplier to provide the second operand such that the second operand is selected from a group including the control output, one of the previous control outputs, and one of a plurality of second coefficients. An adder is adapted to add a product of the multiplier with a second value selected from a group including zero and a previous sum of the adder. A divider is adapted to divide a sum of the adder by the scaling factor $K_1$.

In another embodiment of the invention, a method is provided for controlling a power supply having at least one power switch adapted to convey power between input and output terminals of the power supply. The method comprises the steps of receiving an output measurement of the power supply, sampling the output measurement to provide a digital error signal representing a difference between the output measurement and a reference value, filtering the digital error signal to provide a digital control output based on a sum of previous error signals and previous control outputs, the error signals comprising integers having a relatively low numerical range and said control outputs comprising integers having a relatively high numerical range, and providing a control signal to the at least one power switch, the control signal having a pulse width corresponding to the digital control output. The filtering step further comprises asymmetrically combining the low range integers with the high range integers. The filtering step further comprises filtering said digital error signal using an infinite impulse response filter having the transfer function G(z) described above.

A more complete understanding of the system and method for digitally controlling a switched mode power supply will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a system and method for digitally controlling a switched mode power supply. More particularly, the invention provides a digital signal processor architecture optimized for controlling a switched mode power supply. In the detailed description that follows, like element numerals are used to describe like elements illustrated in one or more figures.

Figure 1:
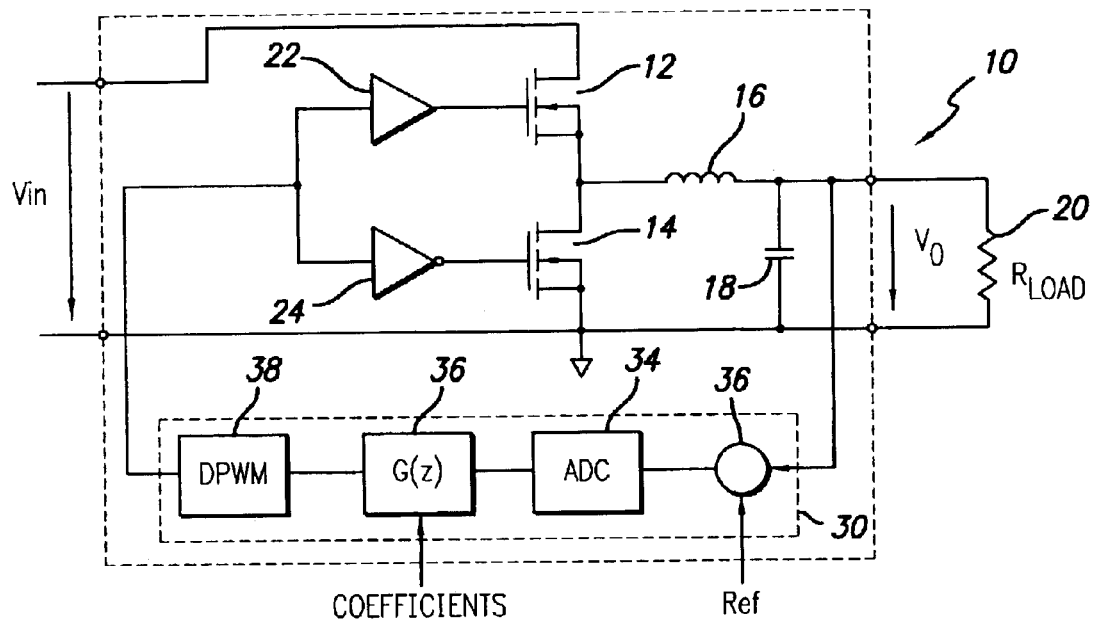
FIG. 1 depicts a switched mode power supply having a digital control circuit.

FIG. 1 depicts an exemplary switched mode power supply 10 having a digital control circuit in accordance with an embodiment of the present invention. The power supply 10 comprises a buck converter topology to convert an input DC voltage $V_{in}$ to an output DC voltage $V_o$ applied to a resistive load 20 ($R_{load}$). The power supply 10 includes a pair of power switches 12, 14 provided by MOSFET devices. The source terminal of the high side power switch 12 is coupled to the input voltage $V_{in}$, the source terminal of the low side power switch 14 is connected to ground, and the drain terminals of the power switches 12, 14 are coupled together to define a phase node. An output inductor 16 is coupled in series between the phase node and the terminal providing the output voltage $V_o$, and a capacitor 18 is coupled in parallel with the resistive load $R_{load}$. Respective drivers 22, 24, alternatingly drive the gate terminals of the power switches 12, 14. In turn, digital control circuit 30 (described below) controls operation of the drivers 22, 24. The opening and closing of the power switches 12, 14 provides an intermediate voltage having a generally rectangular waveform at the phase node, and the filter formed by the output inductor 16 and capacitor 18 converts the rectangular waveform into a substantially DC output voltage $V_o$.

The digital control circuit 30 receives a feedback signal from the output portion of the power supply 10. As shown in FIG. 1, the feedback signal corresponds to the output voltage $V_o$, though it should be appreciated that the feedback signal could alternatively (or additionally) correspond to the output current drawn by the resistive load $R_{load}$ or any other signal representing a parameter to be controlled by the digital control circuit 30. The feedback path may further include a voltage divider (not shown) to reduce the detected output voltage $V_o$ to a representative voltage level. The digital control circuit 30 provides a pulse width modulated waveform having a duty cycle controlled to regulate the output voltage $V_o$ (or output current) at a desired level. Even though the exemplary power supply 10 is illustrated as having a buck converter topology, it should be understood that the use of feedback loop control of the power supply 10 using the digital control circuit 30 is equally applicable to other known power supply topologies, such as boost and buck-boost converters in both isolated and non-isolated configurations.

More particularly, the digital control circuit 30 includes comparator 32, analog-to-digital converter (ADC) 34, digital controller 36, and digital pulse width modulator (DPWM) 38. The comparator 32 receives as inputs the feedback signal (i.e., output voltage $V_o$) and a voltage reference (Ref) and provides an analog voltage error signal (Ref-$V_o$). The ADC 34 produces a digital representation of the voltage error signal ($VEd_k$). The digital controller 36 has a transfer function G(z) that transforms the voltage error signal $VEd_k$ to a digital output provided to the DPWM 38, which converts the signal into a waveform having a proportional pulse width. As discussed above, the pulse-modulated waveform produced by the DPWM 38 is coupled to the gate terminals of the power switches 12,14 through respective drivers 22, 24.

Figure 2:
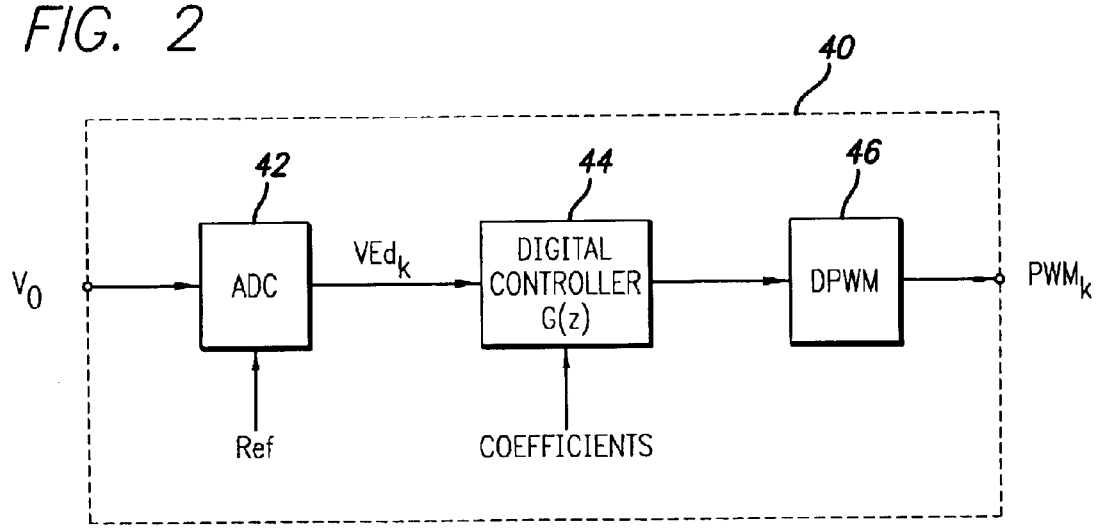
FIG. 2 depicts an alternative digital control circuit including a windowed flash analog-to-digital converter (ADC)

FIG. 2 depicts an alternative digital control circuit 30 that includes a windowed flash ADC 42, digital controller 44, and DPWM 46. The ADC 42 receives as inputs the feedback signal (i.e., output voltage $V_o$) and a voltage reference (Ref), and produces a digital representation of the voltage error signal ($VEd_k$). The digital controller 44 and DPWM 46 operate substantially as described above. The digital controller 44 has a transfer function G(z) that transforms the voltage error signal $VEd_k$ to a digital output provided to the DPWM 46. The pulse-modulated waveform produced by the DPWM 46 is coupled to the gate terminals of the power switches 12, 14 through respective drivers 22, 24.

Single stage (i.e., flash) ADC topologies are utilized in digital power supply applications since they have very low latency (i.e., overall delay between input and output for a particular sample). If a standard flash ADC device is used to quantize the full range of regulator output voltage with desired resolution (e.g., 5 mV), the device will necessarily require a large number of comparators that will dissipate an undesirable amount of power. Under normal operation, the output voltage $V_o$ of the regulator remains within a small window, which means that the ADC need not have a high resolution over the entire range. Accordingly, a "windowed" ADC topology permits high resolution over a relatively small voltage range tracked by a reference voltage ($V_{ref}$). Since the quantization window tracks the reference voltage $V_{ref}$, the signal produced by the ADC will be the voltage error signal. Thus, the windowed ADC provides the dual functions of the ADC and error amplifier, resulting in a further reduction of components and associated power dissipation.

Figure 3:
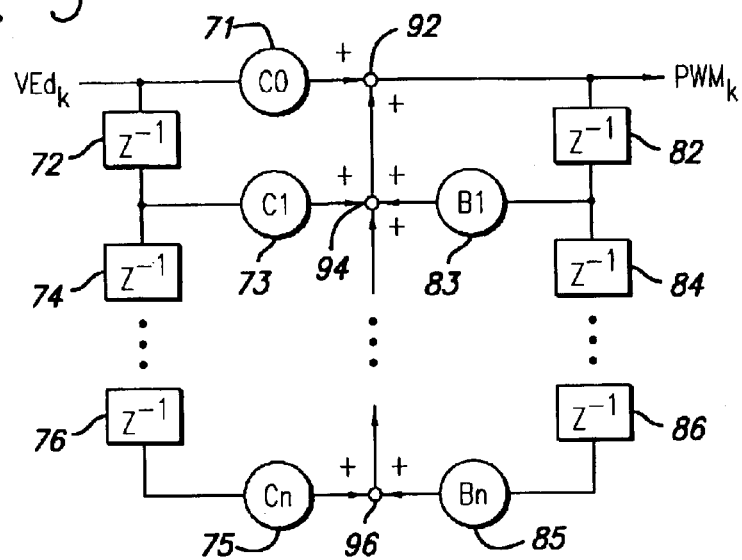
FIG. 3 depicts a digital controller having an infinite impulse response filter.

FIG. 3 depicts a digital controller for use in the above-described control circuits 30 or 40 that includes a digital filter. The digital filter further comprises an infinite impulse response (IIR) filter that produces an output $PWM_k$ from a combination of present and previous voltage error inputs $VEd_k$ and previous outputs $PWM_k$. The IIR filter is illustrated in block diagram form and includes a first plurality of delay registers 72, 74, . . . , 76 (each labeled $z^{-1}$), a first plurality of mathematical operators (multipliers) with coefficients 71, 73, . . . , 75 (labeled C0, C1, . . . , Cn), a second plurality of mathematical operators (adders) 92, 94, 96, a second plurality of delay registers 82, 84, . . . , 86 (each labeled $z^{-1}$), and a third plurality of mathematical operators (multipliers) with coefficients 83, 85 (labeled B1, . . . , Bn). Each of the first delay registers 72, 74, 76 holds a previous sample of the voltage error $VEd_k$, which then is weighted by multiplying with a respective one of the coefficients 71, 73, 75. Likewise, each of the second delay registers 82, 84, 86 holds a previous sample of the output $PWM_k$, which is then weighted by multiplying with a respective one of the coefficients 83, 85. The adders 92, 94, and 96 combine the weighted input and output samples. It should be appreciated that a greater number of delay registers and coefficients may be included in the digital filter, and that a limited number is shown in FIG. 3 for exemplary purposes only.

The digital filter structure shown in FIG. 3 is an exemplary implementation of the following transfer function $G(z)$:

$$G(z) = \frac{PWM(z)}{VEd(z)} = \frac{C_0 + C_1 \cdot z^{-1} + C_2 \cdot z^{-2} + \ldots + C_n \cdot z^{-n}}{1 - B_1 \cdot z^{-1} - B_2 \cdot z^{-2} - \ldots - B_n \cdot z^{-n}}$$

The order and the filter coefficients of the transfer function $G(z)$ are chosen such that the feedback loop closes with the desired bandwidth and phase margin.

Although the digital filter and associated transfer function $G(z)$ reflect n delay stages on both the input and output stages, an exemplary 3$^{rd}$ order implementation of the digital filter in accordance with the present invention utilizes four numerator coefficients ($C_0, C_1, C_2, C_3$) and three denominator coefficients ($B_1, B_2, B_3$), yielding the following modified transfer function $G(z)$:

$$G(z) = \frac{PWM(z)}{VEd(z)} = \frac{C_0 + C_1 \cdot z^{-1} + C_2 \cdot z^{-2} + C_3 \cdot z^{-3}}{1 - B_1 \cdot z^{-1} - B_2 \cdot z^{-2} - B_3 \cdot z^{-3}}$$

It should be appreciated that the invention is not limited to 3$^{rd}$ order systems. The modified transfer function $G(z)$ can be expressed in time discrete form as follows:

$$PWM_k = C_0 \cdot VEd_k + C_1 \cdot VEd_{k-1} + C_2 \cdot VEd_{k-2} + C_3 \cdot VEd_{k-3} + B_1 \cdot PWM_{k-1} + B_2 \cdot PWM_{k-2} + B_3 \cdot PWM_{k-3}$$

The value range of $PWM_k$ is from 0 to 1. In order to use integer calculations in the digital filter, a first scaling factor $K_1$ for the overall filter and a second scaling factor $K_2$ for the $PWM_k$ signal are defined. The scaled $PWM_k$ signal will therefore be in the range from 0 to $K_2-1$. The time discrete form transfer function can hence be re-written as follows:

$$PWM'_k = \frac{1}{K_1} \cdot (C'_0 \cdot VEd_k + C'_1 \cdot VEd_{k-1} + C'_2 \cdot VEd_{k-2} + C'_3 \cdot VEd_{k-3} + B'_1 \cdot PWM'_{k-1} + B'_2 \cdot PWM'_{k-2} + B'_3 \cdot PWM'_{k-3})$$

wherein $PWM'_k = K_2 \cdot PWM_k$ $C'_i = K_1 \cdot K_2 \cdot C_i$ $B'_i = K_1 \cdot B_i$ It should be appreciated that alternative scaling schemes are possible, like partial scaling of the filter equation to improve overall calculation accuracy. From the foregoing time discrete form transfer function, it can be seen that the coefficients $C'_i$ tend to be much larger than the coefficients $B'_i$. An exemplary scaling factor $K_1$ can be $2^3$ and $K_2$ can be as large as $2^{12}$, giving a PWM range from 0 to 4,095. As will be further understood from the following discussion, this difference in magnitude can be used in optimizing a digital signal processor architecture that implements the digital filter.

In an embodiment of the invention, the transfer function can be calculated in a series of steps. This assures that the error voltage $VEd_k$ can be sampled as close as possible to the start of the new PWM cycle with the value $PWM'_k$. The steps for calculating the transfer function are as follows:

$PWM'^0_k = B'_3 \cdot PWM'_{k-3} + 0$     (1)

$PWM'^1_k = B'_2 \cdot PWM'_{k-2} + PWM'^0_k$     (2)

$PWM'^2_k = B'_1 \cdot PWM'_{k-1} + PWM'^1_k$     (3)

$PWM'^3_k = C'_3 \cdot VEd_{k-3} + PWM'^2_k$     (4)

$PWM'^4_k = C'_2 \cdot VEd_{k-2} + PWM'^3_k$     (5)

$PWM'^5_k = C'_1 \cdot VEd_{k-1} + PWM'^4_k$     (6)

$PWM'^6_k = C'_0 \cdot VEd_k + PWM'^5_k$     (7)

Figure 4:
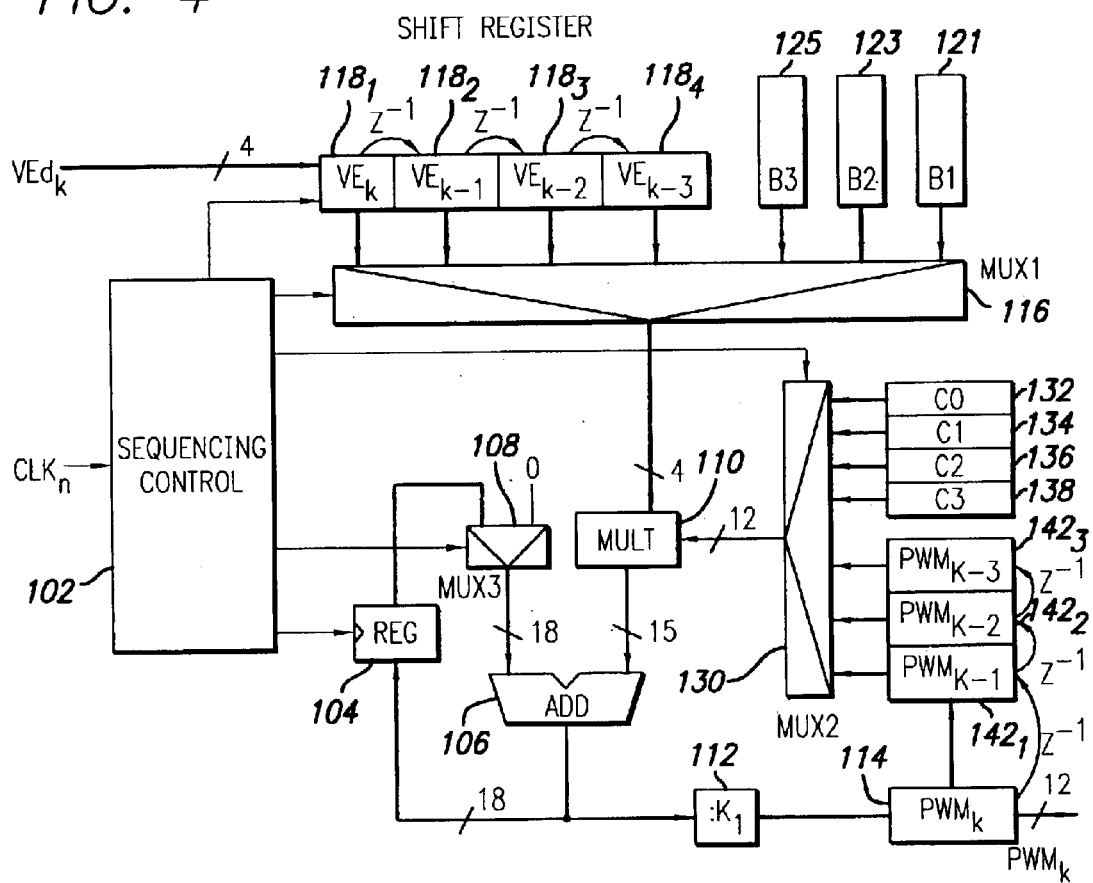
FIG. 4 depicts a digital signal processor optimized to implement the digital filter.

FIG. 4 depicts a digital signal processor architecture adapted to implement the digital filter in accordance with the specified order for calculating the transfer function components. The digital signal processor includes an arithmetic unit having a multiplier 110, an adder 106, multiplexers 108, 116, 130, divider 112, and sequencing control unit 102. The sequencing control unit 102 controls the timing for the feeding of samples and coefficients to the arithmetic unit responsive to an input clock ($CLK_n$), and provides appropriate enabling signals to the multiplexers 108, 116, 130, shift register 118, and register 104. Multiplier 110 multiplies inputs received from the multiplexers 116 and 130. Adder 106 adds the product of multiplier 110 with an input received from multiplexer 108, and passes the sum to register 104 and divider 112. Multiplexer 108 passes either the contents of register 104 or zero. Divider 112 divides the sum from adder 106 by the scaling factor $K_1$, and provides the result to register 114. Multiplexer 116 receives inputs from shift register 118 and registers 121, 123, 125. Shift register 118 further comprises stages $118_1$, $118_2$, $118_3$, $118_4$. The voltage error signal $VEd_k$ is provided to the first shift register stage $118_1$, and moves with each clock cycle through the successive stages $118_2$, $118_3$, $118_4$ such that the subsequent stages hold previous samples of the voltage error signal $VEd_k$ (i.e., $VEd_{k-a}$, $VEd_{k-2}$, $VEd_{k-3}$, respectively). Registers 121, 123, 125 hold respective coefficients $B_1$, $B_2$, $B_3$. Multiplexer 130 receives inputs from shift register 142 and registers 132, 134, 136, 138. Shift register 142 further comprises stages 1421, 1422, 1423. The output signal $PWM'_k$ is provided to the register 114, then moves with each clock cycle through the successive stages $142_1$, $142_2$, $142_3$ such that the subsequent stages hold previous samples of the output signal $PWM'_k$ (i.e., $PWM'_{k-1}$, $PWM'_{k-2}$, $PWM'_{k-3}$). Registers 132, 134, 136, 138 hold respective coefficients $C_0$, $C_1$, $C_2$, $C_3$.

The exemplary voltage error signal $VEd_k$ is a four-bit digital value. The voltage error signal samples are multiplied with the $C_i$ coefficients, which are relatively large (i.e., twelve-bit) due to the scaling with the relatively large factor $K_1$. The previously calculated output signal samples $PWM'_k$ (also twelve-bit digital values) are multiplied with the relatively small $B_i$ coefficients to produce eighteen-bit digital output values. Therefore, grouping the relatively small voltage error signals $VEd_k$ with the $B_i$ coefficients, and the relatively large output signals $PWM'_k$ with the $C_i$ coefficients can conserve device size. The multiplier 110 can therefore be an asymmetrical four-by-twelve bit design, which is much smaller than a conventional twelve-by-twelve bit multiplier, resulting in a substantial reduction of device size and associated power draw.

The digital signal processor architecture is used to calculate the transfer function as follows. In the first step, $PWM'^0_k$ is calculated. Multiplexer 116 passes coefficient $B_3$ from register 125 to the multiplier 110, and multiplexer 130 passes $PWM'_{k-3}$ from register $142_3$ to the multiplier 110. The multiplier 110 multiplies the two values and passes the product to one input of the adder 106. Multiplexer 108 passes zero to the other input of the adder 106, and the two values are added together. The sum (i.e., $PWM'^0_k$) is stored in register 104.

In the second step, $PWM'^1_k$ is calculated. Multiplexer 116 passes coefficient $B_2$ from register 123 to the multiplier 110, and multiplexer 130 passes $PWM'_{k-2}$ from register $142_2$ to the multiplier 110. The multiplier 110 multiplies the two values and passes the product to one input of the adder 106. Multiplexer 108 passes the contents of register 104 (i.e., $PWM'^0_k$) to the other input of the adder 106, and the two values are added together. The sum (i.e., $PWM'^1_k$) is stored in register 104.

In the third step, $PWM'^2_k$ is calculated. Multiplexer 116 passes coefficient $B_1$ from register 121 to the multiplier 110, and multiplexer 130 passes $PWM'^1_k$ from register $142_1$ to the multiplier 110. The multiplier 110 multiplies the two values and passes the product to one input of the adder 106. Multiplexer 108 passes the contents of register 104 (i.e., $PWM'^1_k$) to the other input of the adder 106, and the two values are added together. The sum (i.e., $PWM'^2_k$) is stored in register 104.

In the fourth step, $PWM'^3_k$ is calculated. Multiplexer 116 passes voltage error signal $VEd_{k-3}$ from register $118_4$ to the multiplier 110, and multiplexer 130 passes coefficient $C_3$ from register 138 to the multiplier 110. The multiplier 110 multiplies the two values and passes the product to one input of the adder 106. Multiplexer 108 passes the contents of register 104 (i.e., $PWM'^2_k$) to the other input of the adder 106, and the two values are added together. The sum (i.e., $PWM'^3_k$) is stored in register 104.

In the fifth step, $PWM'^4_k$ is calculated. Multiplexer 116 passes voltage error signal $VEd_{k-2}$ from register $118_3$ to the multiplier 110, and multiplexer 130 passes coefficient $C_2$ from register 136 to the multiplier 110. The multiplier 110 multiplies the two values and passes the product to one input of the adder 106. Multiplexer 108 passes the contents of register 104 (i.e., $PWM'^3_k$) to the other input of the adder 106, and the two values are added together. The sum (i.e., $PWM'^4_k$) is stored in register 104.

In the sixth step, $PWM'^5_k$ is calculated. Multiplexer 116 passes voltage error signal $VEd_{k-1}$ from register $118_2$ to the multiplier 110, and multiplexer 130 passes coefficient $C_1$ from register 134 to the multiplier 110. The multiplier 110 multiplies the two values and passes the product to one input of the adder 106. Multiplexer 108 passes the contents of register 104 (i.e., $PWM'^4_k$) to the other input of the adder 106, and the two values are added together. The sum (i.e., $PWM'^5_k$) is stored in register 104.

Lastly, in the seventh step, $PWM'^6_k$ is calculated. Multiplexer 116 passes voltage error signal $VEd_k$ from register $118_1$ to the multiplier 110, and multiplexer 130 passes coefficient $C_0$ from register 132 to the multiplier 110. The multiplier 110 multiplies the two values and passes the product to one input of the adder 106. Multiplexer 108 passes the contents of register 104 (i.e., $PWM'^5_k$) to the other input of the adder 106, and the two values are added together. The sum (i.e., $PWM'^6_k$) is applied to the numerator of divider 112 and is dividing by scaling factor $K_1$. The final result $PWM'_k$ is loaded in register 114 and also provided as an output to the digital pulse width modulator.

Having thus described a preferred embodiment of a system and method for digitally controlling a switched mode power supply, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A power supply comprising:

at least one power switch adapted to convey power between respective input and output terminals of said power supply; and a digital controller adapted to control operation of said at least one power switch responsive to an output parameter of said power supply, said digital controller comprising:

an analog-to-digital converter providing a digital error signal representing a difference between said output measurement and a reference value;

a digital filter providing a digital control output based on sum of present and previous error signals and previous control outputs, said error signals comprising integers having a relatively low numerical range and said control outputs comprising integers having a relatively high numerical range, said digital filter further comprising an asymmetric arithmetic unit adapted to combine said low range integers with said high range integers; and a digital pulse width modulator providing a control signal to said at least one power switch, said control signal having a pulse width corresponding to said digital control output.

2. The power supply of claim 1, wherein said analog-to-digital converter further comprises a windowed flash analog-to-digital converter.

3. The power supply of claim 1, wherein said digital filter further comprises an infinite impulse response filter.

4. The power supply of claim 3, wherein said infinite impulse response filter provides the following transfer function G(z):

$$G(z) = \frac{PWM(z)}{VEd(z)} = \frac{C_0 + C_1 \cdot z^{-1} + C_2 \cdot z^{-2} + \ldots + C_n \cdot z^{-n}}{1 - B_1 \cdot z^{-1} - B_2 \cdot z^{-2} - \ldots - B_n \cdot z^{-n}}$$

wherein PWM(z) is the digital control output, VEd(z) is the error signal, $C_0 \ldots C_n$ are input side coefficients, and $B_1 \ldots B_n$ are output side coefficients.

5. The power supply of claim 3, wherein said infinite impulse response filter further comprises a $3^{rd}$ order filter having the following transfer function G(z):

$$G(z) = \frac{PWM(z)}{VEd(z)} = \frac{C_0 + C_1 \cdot z^{-1} + C_2 \cdot z^{-2} + C_3 \cdot z^{-3}}{1 - B_1 \cdot z^{-1} - B_2 \cdot z^{-2} - B_3 \cdot z^{-3}}$$

wherein PWM(z) is the digital control output, VEd(z) is the error signal, $C_0 \ldots C_3$ are input side coefficients, and $B_1 \ldots B_3$ are output side coefficients.

6. The power supply of claim 5, wherein said infinite impulse response filter provides the following time discrete form transfer function:

$$PWM'_k = \frac{1}{K_1} \cdot (C'_0 \cdot VEd_k + C'_1 \cdot VEd_{k-1} + C'_2 \cdot VEd_{k-2} + C'_3 \cdot VEd_{k-3} + B'_1 \cdot PWM'_{k-1} + B'_2 \cdot PWM'_{k-2} + B'_3 \cdot PWM'_{k-3})$$

wherein $K_1$ and $K_2$ are scaling factors selected such that the scaled PWM'$_k$ signal will be in the range from 0 to $K_2-1$ and wherein PWM'$_k$ is the digital control output, VEd$_k$ is the error signal, $C_0 \ldots C_3$ are input side coefficients, and $B_1 \ldots B_3$ are output side coefficients, and:

$PWM'_k = K_2 \cdot PWM'_k$ $C'_i = K_1' \cdot K_2 \cdot C_i$ $B'_i = K_1 \cdot B_i.$ 7. The power supply of claim 1, wherein said arithmetic unit further comprises a multiplier adapted to multiply two operands, wherein a first operand comprises a first bit size and a second operand comprises a second, substantially larger, bit size.

8. The power supply of claim 7, wherein said first bit size is four.

9. The power supply of claim 7, wherein said second bit size is twelve.

10. The power supply of claim 7, wherein said arithmetic unit further comprises a first multiplexer coupled to said multiplier to provide said first operand, said first operand being selected from a group including said error signal, one of said previous error signals, and one of a plurality of first coefficients.

11. The power supply of claim 10, wherein said arithmetic unit further comprises a second multiplexer coupled to said multiplier to provide said second operand, said second operand being selected from a group including said control output, one of said previous control outputs, and one of a plurality of second coefficients.

12. The power supply of claim 7, wherein said arithmetic unit further comprises an adder adapted to add a product of said multiplier with second value selected from a group including zero and a previous sum of said adder.

13. The power supply of claim 12, wherein said arithmetic unit further comprises a divider adapted to divide a sum of said adder by a scaling factor.

14. A method of controlling a switched mode power supply comprising at least one power switch adapted to convey power between input and output terminals of said power supply, said method comprising:

receiving an output measurement of said power supply;

sampling said output measurement to provide a digital error signal representing a difference between said output measurement and a reference value;

filtering said digital error signal to provide a digital control output based on a sum of previous error signals and previous control outputs; said error signals comprising integers having a relatively low numerical range and said control outputs comprising integers having a relatively high numerical range; and providing a control signal to said at least one power switch, said control signal having a pulse width corresponding to said digital control output.

15. The method of claim 14, wherein said filtering step further comprising asymmetrically combining said low range integers with said high range integers.

16. The method of claim 14, wherein filtering step further comprises filtering said digital error signal using an infinite impulse response filter.

17. The method of claim 16, wherein said filtering step further comprises filtering said digital error signal using an infinite impulse response filter having the following transfer function G(z):

$$G(z) = \frac{PWM(z)}{VEd(z)} = \frac{C_0 + C_1 \cdot z^{-1} + C_2 \cdot z^{-2} + \ldots + C_n \cdot z^{-n}}{1 - B_1 \cdot z^{-1} - B_2 \cdot z^{-2} - \ldots - B_n \cdot z^{-n}}$$

wherein PWM(z) is the digital control output, VEd(z) is the error signal, $C_0 \ldots C_n$ are input side coefficients, and $B_1 \ldots B_n$ are output side coefficients.

18. The method of claim 16, wherein said filtering step further comprising filtering said digital error signal using a $3^{rd}$ order infinite impulse response filter having the following transfer function G(z):

$$G(z) = \frac{PWM(z)}{VEd(z)} = \frac{C_0 + C_1 \cdot z^{-1} + C_2 \cdot z^{-2} + C_3 \cdot z^{-3}}{1 - B_1 \cdot z^{-1} - B_2 \cdot z^{-2} - B_3 \cdot z^{-3}}$$

wherein PWM(z) is the digital control output, VEd(z) is the error signal, $C_0 \ldots C_3$ are input side coefficients, and $B_1 \ldots B_3$ are output side coefficients.

19. The method of claim 18, wherein said infinite impulse response filter provides the following time discrete form transfer function:

$$PWM'_k = \frac{1}{K_1} \cdot (C'_0 \cdot VEd_k + C'_1 \cdot VEd_{k-1} + C'_2 \cdot VEd_{k-2} + C'_3 \cdot VEd_{k-3} + B'_1 \cdot PWM'_{k-1} + B'_2 \cdot PWM'_{k-2} + B'_3 \cdot PWM'_{k-3})$$

wherein $K_1$ and $K_2$ are scaling factors selected such that the scaled PWM'$_k$ signal will be in the range from 0 to $K_2-1$ and wherein $PWM'_k$ is the digital control output, $VEd_k$ is the error signal, $C_0 \ldots C_3$ are input side coefficients, and $B_1 \ldots B_3$ are output side coefficients, and:

$$PWM'_k = K_2 \cdot PWM'_k$$

$$C_i' = K_1 \cdot K_2 \cdot C_i$$

$$B_i' = K_1 \cdot B_i.$$

20. The method of claim 14, wherein said filtering step further comprises multiplying two operands, wherein a first operand comprises a first bit size and a second operand comprises a second, substantially larger, bit size.

21. The method of claim 20, wherein said first bit size is four.

22. The method of claim 20, wherein said second it size is twelve.

23. The method of claim 20, wherein said filtering step further comprises selecting said first operand from a group including said error signal, one of said previous error signals, and one of a plurality of first coefficients.

24. The method of claim 20, wherein said filtering step further comprises selecting said second operand from a group including said control output, one of said previous control outputs, and one of a plurality of second coefficients.

25. The method of claim 20, wherein said filtering step further comprises adding a product of said multiplying step with second value selected from a group including zero and a previous sum of said adder.

26. The method of claim 25, wherein said filtering step further comprises dividing a sum of said adding step by a scaling factor.

* * * * *